US006775409B1

(12) United States Patent
Brunelli et al.

(10) Patent No.: US 6,775,409 B1
(45) Date of Patent: Aug. 10, 2004

(54) METHOD FOR LOCATING CODES IN BIDIMENSIONAL IMAGES

(75) Inventors: Elena Brunelli, Bentivoglio (IT); Francesco Caselli, Bologna (IT); Marco Bottazzi, Ferrara (IT)

(73) Assignee: Data Logic S.p.A., Di Reno (IT)

( * ) Notice: Subject to any disclaimer, the term of this patent is extended or adjusted under 35 U.S.C. 154(b) by 0 days.

(21) Appl. No.: 09/425,168

(22) Filed: Oct. 22, 1999

(30) Foreign Application Priority Data

Oct. 23, 1998 (EP) ............................................ 98830646

(51) Int. Cl.[7] .................................................. G06K 9/46
(52) U.S. Cl. ....................... 382/199; 382/205; 382/291; 382/170
(58) Field of Search ................................. 382/170, 199, 382/291, 183, 205; 235/462.09, 462.41

(56) References Cited

U.S. PATENT DOCUMENTS

| 5,373,147 | A |   | 12/1994 | Noda |   |
|---|---|---|---|---|---|
| 5,487,115 | A | * | 1/1996 | Surka | .................... 235/462.09 |
| 5,748,804 | A | * | 5/1998 | Surka | .................... 235/462.08 |
| 6,047,893 | A | * | 4/2000 | Saporetti | ................ 235/462.08 |
| 6,453,069 | B1 | * | 9/2002 | Matsugu et al. | ............ 382/173 |

FOREIGN PATENT DOCUMENTS

| EP |   | 0 689 152 | 12/1995 |
| EP |   | 0689152 | 12/1995 |
| EP |   | 0 795 836 | 9/1997 |
| EP |   | 0795836 | 9/1997 |
| EP |   | A-0 851 374 | 7/1998 |

OTHER PUBLICATIONS

Viard–Gaudin et al. "A Bar Code Location Algorithm Using a Two–Dimensional Approach." Proc. of the $2^{nd}$ Int. Conf. on Document Analysis and Recognition, Oct. 1993, pp. 45–48.*
(1) European Search Report with Annex.
R. Gonzalez, R. E. Woods: "Digital Image Processing", Addison Wesley, 1992, pp 195–201 and 416–421, 458–461.
R. Sedgewick: "Alogrithms", $2^{nd}$ Edition, Addision Wesley, 1988, pp. 359–371.
AIM Specifications for Datamatrix: 1997, pp. cover and p. 22.
AIM Specifications for Datamatrix: 1996, cover page and pp. 19–21.

* cited by examiner

Primary Examiner—Jon Chang
(74) Attorney, Agent, or Firm—Lowe Hauptman Gilman & Berner, LLP.

(57) ABSTRACT

The method comprises acquiring a bidimensional image formed by a plurality of dots, characterized by a brightness value; dividing the bidimensional image into a plurality of image regions, each formed by a respective first number of dots; for each of the image regions, determining a first quantity correlated to the brightness variation intensity of each dot with respect to adjacent dots; for each image region, determining at least one second quantity correlated to the brightness variation direction of each dot with respect to adjacent dots; and determining any presence and type of a code in each of the image regions, on the basis of the determined quantities. These quantities typically comprise the contrast level of the image region, obtained by adding the gradient variation intensity of all contrast dots of the image region and directionality of the image region, obtained by calculating the gradient variation direction for all dots and searching for the prevalent direction or directions.

21 Claims, 8 Drawing Sheets

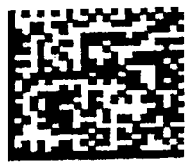   
Datamatrix    Maxicode    QR-Code    PDF 417 - Stacked
Fig. 1a PRIOR ART    Fig. 1b PRIOR ART    Fig. 1c PRIOR ART    Fig. 1d PRIOR ART
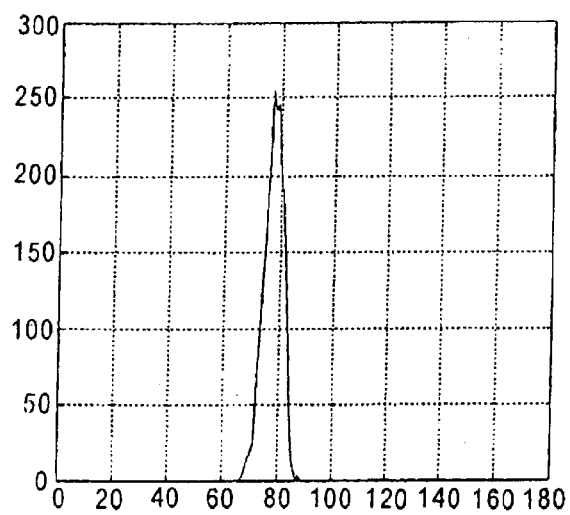
Fig. 4a

METHOD FOR LOCATING CODES IN BIDIMENSIONAL IMAGES

The present invention relates to a method for locating codes in bidimensional images.

BACKGROUND OF THE INVENTION

Codes are known for coding information, for example for optical identification of objects. In particular, at present, extensive use is made of bar codes, used in an ever-increasing variety of applications, owing to their compactness, robustness with respect to environmental conditions, which permit automatic decoding even in presence of a high noise level and the possibility of automatic reading and interpretation. However, they allow storage of a relatively limited amount of information; in order to overcome this limitation, bidimensional codes have recently been proposed, such as the Datamatrix, Maxicode, QR-Code and stacked codes (for example PDF417), examples of which are shown respectively in FIGS. 1a, 1b, 1c and 1d.

These bidimensional codes can also be read by acquiring bidimensional images in an area where a code is expected and locating the code within the-image, for later decoding. In particular, code locating must permit discriminating, within the image stored in a processor memory, the region or regions comprising one or a plurality of codes, from areas comprising other objects or figures. In first instance, locating is aimed at finding specific recognition patterns, typical for each code; knowledge of a pattern location and of the type of code makes it possible to extract the code from the image and then to decode it.

SUMMARY OF THE INVENTION

The object of the invention is to provide a new method for locating codes in bidimensional images.

According to the present invention, a method is provided for locating codes in bidimensional images, comprising the step of acquiring a bidimensional image formed by a plurality of dots characterized by a brightness value, characterized by the steps of:

dividing said bidimensional image into a plurality of image regions, each of said image regions comprising a respective first number of dots;

for each of said image regions, determining a first quantity correlated to the brightness variation intensity of respective dots with respect to adjacent dots;

for each of said image regions, determining at least one second quantity correlated to the brightness variation direction of the respective dots with respect to adjacent dots; and determining any presence and type of a code in each of said image regions, on the basis of said first and said second quantities.

The image is preferably divided into blocks of a sufficient dimension to contain a portion of a code, or at the most an entire code, but no more than one code, to simplify subsequent processing; in each block, the brightness variation intensity is evaluated, to eliminate blocks with low contrast, which definitely do not contain codes; and for each sufficiently contrasted block, the brightness variation direction is evaluated, which is correlated to the type of any present code.

To estimate the brightness variation intensity, the dot gradient is preferably used and the values of intensity of the gradient, calculated for all dots of each block are summed; then only blocks are considered which have a sum greater than a predetermined threshold. In addition, to estimate the brightness variation direction, the dot brightness gradient direction is used and for the considered blocks, the prevalent gradient direction or directions is or are calculated. For each considered block, if there is a single prevalent direction, it is decided that the block contains a linear (bar or stacked) code; if there are two prevalent directions, this means that a Datamatrix code or a QR-Code is involved.

The locating information (block containing a code) and the code type are then used to carry out fine localization and segmentation, to determine accurately code outlines.

BRIEF DESCRIPTION OF THE DRAWINGS

Further features of the invention will become apparent from the description of a preferred embodiment, provided purely by way of non-limiting example and illustrated in the attached drawings, wherein:

FIGS. 1a, 1b, 1c and 1d show examples of bidimensional codes of a known type;

FIGS. 4a, 4b and 4c illustrate histograms relative to the characteristics distribution of known bidimensional codes;

DETAILED DESCRIPTION OF THE INVENTION

Figure 2:
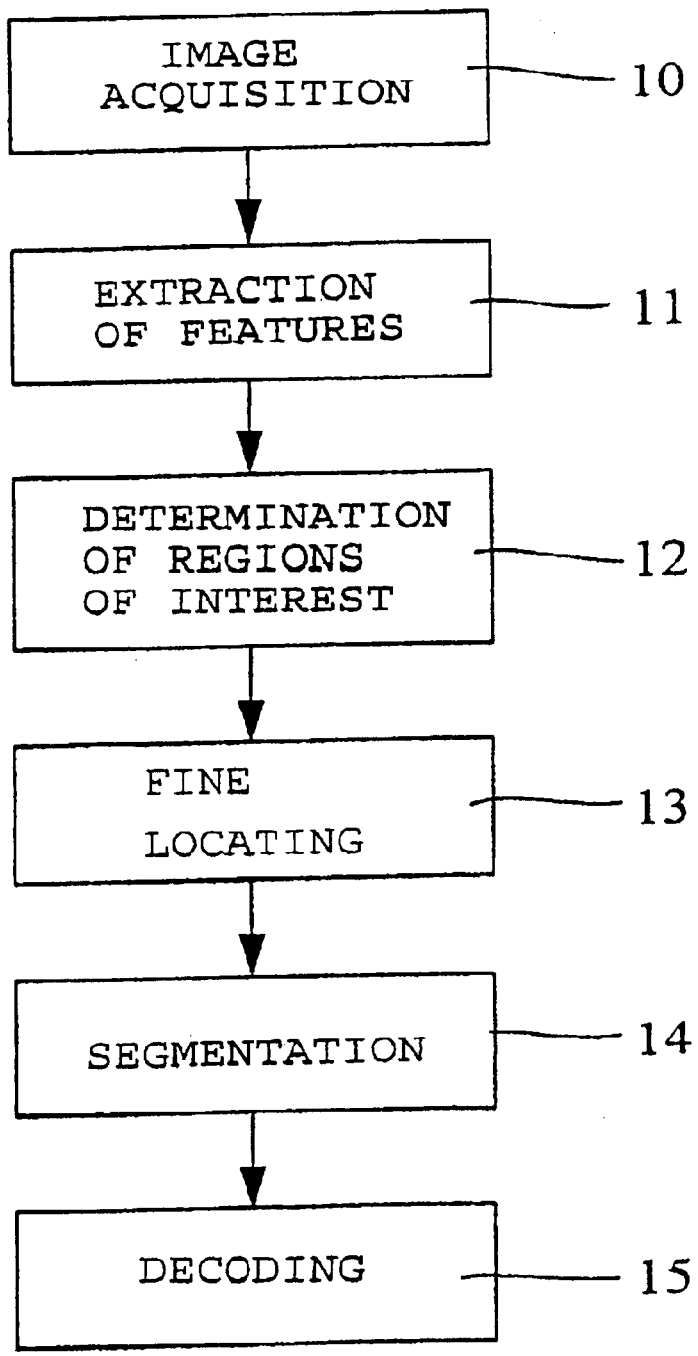
FIG. 2 shows a flow chart regarding reading an optical code from bidimensional images.

As shown in FIG. 2, to search for and read a code from a bidimensional image, initially the image of a space portion is acquired and stored, where at least one informative code (block 10) is sought. In particular, the image can be acquired by any type of telecamera or registration device which can provide at the output a digitised image as grey levels, formed by a plurality of pixels, each representing the brightness of the image at the each dot, preferably coded through at least 8 bits (at least 256 grey levels). The digitised image is then stored in an appropriate memory (not shown), for subsequent processing.

In detail, the so-called interest features are initially sought and extracted from the digitised image, block 11. This pre-processing step, described in detail hereinafter with reference to FIG. 3, serves the purpose of extracting some basic information for subsequent determination of the interest regions, i.e. the regions containing the recognition pattern of each code type. According to the invention, these interest features are correlated to local variations of brightness of the digitised image. In fact, in the interest regions, the brightness values vary considerably in adjacent pixels; thus, the code search can be limited to areas having high brightness variations, since the code search in areas of the digitised image which have virtually constant brightness is pointless.

Subsequently, on the basis of the extracted interest features, the interest region or regions containing a single code is or are determined within the entire digitised image and the type of code present in each of the determined interest regions is also estimated, block 12, as explained in detail hereinafter.

Then, for each of these interest regions, the code is located accurately, block 13, and the code geometric boundaries are determined accurately, block 14; finally, the decoding features are extracted and the code is actually decoded, block 15.

The step of extracting the interest features 11 allows the local brightness variation direction to be determined in restricted areas around the individual pixels of the digitised image. Specifically, in the considered example, the gradient intensity (magnitude) and the brightness gradient direction are determined; as an alternative to the gradient intensity, it is possible to use the contrast (by converting to binary form the brightness value of the pixels to obtain only white or black pixels and calculating the ratio between the number of white and black pixels in a specific area); in addition it is possible to use also the information relative to the brightness gradient direction.

These quantities can be calculated either for each pixel of the digitised image, when the dimensions of the digitised image permit, or for selected pixels, by secondary sampling the digitised image, when the latter has large dimensions. In both cases, the interest features can be calculated using any method known in the literature, such as that illustrated in EP-A-0 851 374 of the same applicant. As an alternative, it is possible to use Sobel's convolution with kernels (see for example R. Gonzalez, R. E. Woods: "Digital Image Processing", Addison Wesley, 1992) wherein, for each considered pixel, the derivative of brightness is calculated along the x and y axes, using the eight pixels surrounding the considered pixel, obtaining a two-component bidimensional vector; the intensity is then calculated as the square root of the sum of the squares of the two components and the direction is calculated as the arc tangent of the ratio between the two components. According to an alternative, it is also possible to use Kirch's operator, which applies eight different operators (3×3) to each considered pixel, by calculating the derivative along eight possible directions around the pixel and selecting whichever of the eight directions has the highest value; thereby, in a single operation, brightness gradient intensity and direction of each considered pixel are obtained.

At the end of the step of extracting the interest features 11, two images or dot arrays are then obtained, one related to the gradient intensity (called gradient intensity image) and the other related to the gradient direction (called gradient direction image), the dots whereof (still called pixels hereinafter, for the sake of uniformity), have the value of the just determined quantity. The gradient intensity image can then be subjected to a threshold step to eliminate (i.e. to set to zero) dots with low gradient intensity. The threshold can be calculated using a statistical method known in the literature, for example a Montecarlo method, described in D. Montgomery, G. C. Runger: "Applied Statistics and Probability for Engineers", Wiley, 1994.

Figure 3:
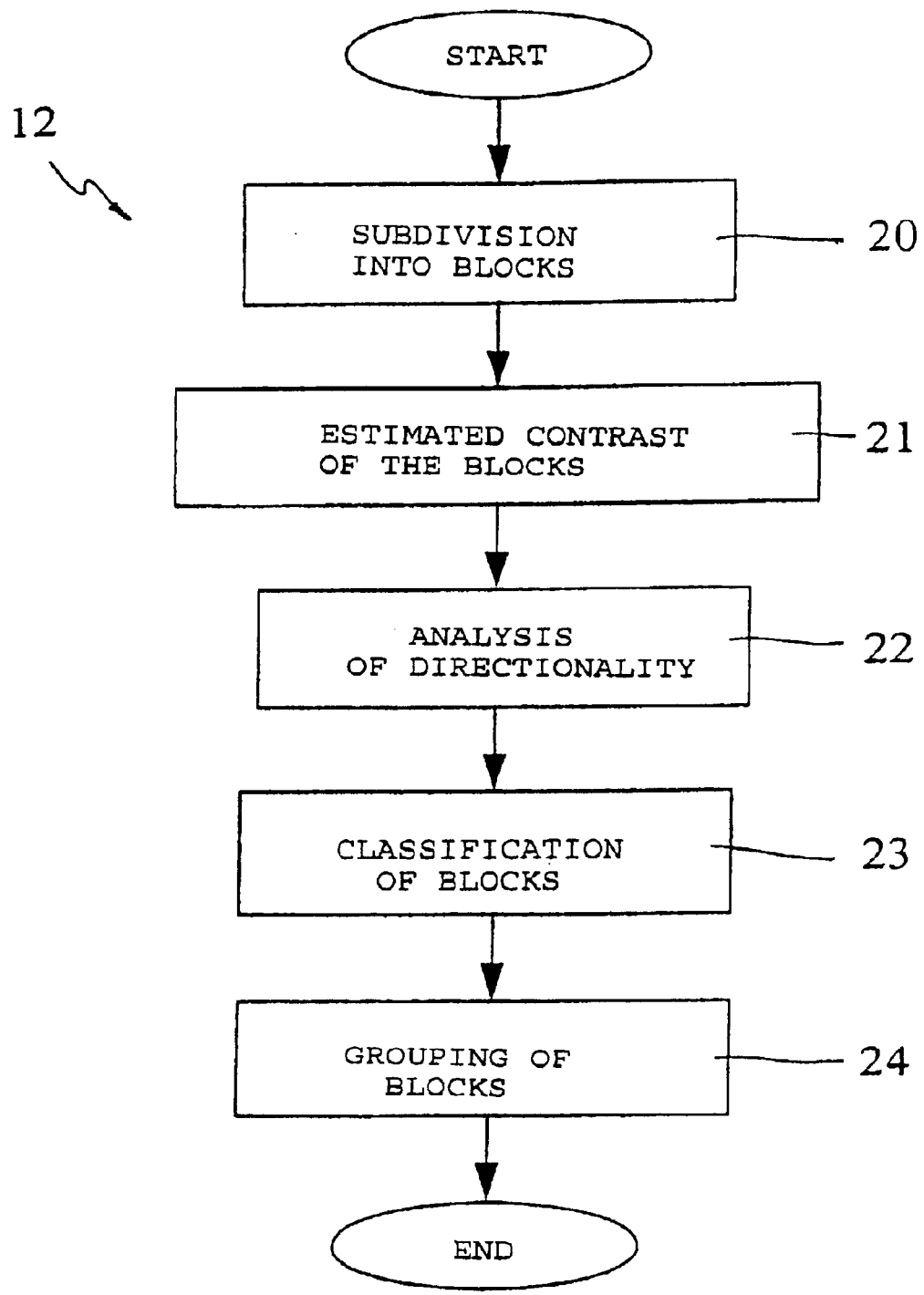
FIG. 3 shows a detailed flow chart of a block of FIG. 2.

The step of determining the interest regions 12 comprises a series of secondary steps, described here in detail with reference to FIG. 3. In particular, the digitised image is initially divided into blocks, i.e. square or rectangular regions, having quite large dimensions, so as to contain a significant part of codes to be decoded, block 20. For example, for a digitised image of 512×512 pixels, square blocks of 64×64 or 48×48 pixels can be taken. The blocks can be either adjacent or partially overlapping; in this second case, greater accuracy is obtained, although the amount of calculation is increased.

Subsequently, the contrast level of all blocks is estimated from the gradient intensity image, obtained in the step of extracting the interest features 11, block 21. In particular, the contrast level can be efficiently estimated using the pixels of the gradient intensity image, by summing the value of all pixels of each block and optionally normalising this value with respect to the number of pixels contained in each block. A block contrast image is thus obtained.

The directionality of the blocks is then analysed, to identify and determine the type of code present in one or more of the blocks, block 22. This step, which uses the gradient direction image and preferably uses only the blocks wherein the contrast exceeds a predetermined threshold, is based on the fact that the various types of code can be discriminated from one another on the basis of the gradient direction of the pixels of each block, identified through specific histograms having different peaks according to the code type, as explained hereinafter with reference to FIGS. 4a–4c and 5.

Thus, from all the blocks having a greater contrast than the predetermined threshold, this step makes it possible to determine those containing codes, as well as any prevalent directions, as explained in detail hereinafter.

Subsequently, the blocks of the digitised image wherein a code has been detected, are classified by types and ordered according to significance, block 23. In particular, all the blocks of the same type and having the same prevalent direction or directions are separated from the others and ordered according to significance, by applying a cost function, for example the total gradient intensity, or the area subtended by the dominant peak in the direction histogram, etc.

Finally, the step of identificating the code interest region or regions is carried out, block 24; in particular, using a growth procedure (region growing) known in literature (see the aforementioned text by R. Gonzalez, R. E. Woods), similar blocks are grouped together, using as an initial seed the most significant block, determined in the previous step.

The step of direction analysis 22 is described in detail hereinafter with reference to FIGS. 4a, 4b, 4c and 5. As already stated, the step 22 exploits the fact that codes of different types have histograms with different forms; thus, by examining the histogram associated with each block, it is possible to identify the presence of a code and its type. In particular, in the present context, the term histogram identifies a graph which has on its x-axis all possible direction values (from 0° to 180°, with increments of 1°) and on its y-axis the number of pixels of the considered block which have that direction value.

Figure 4B:
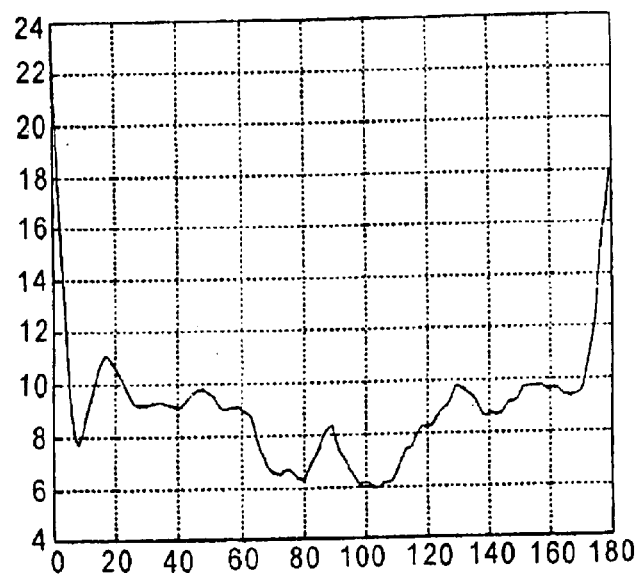
Figure 4C:
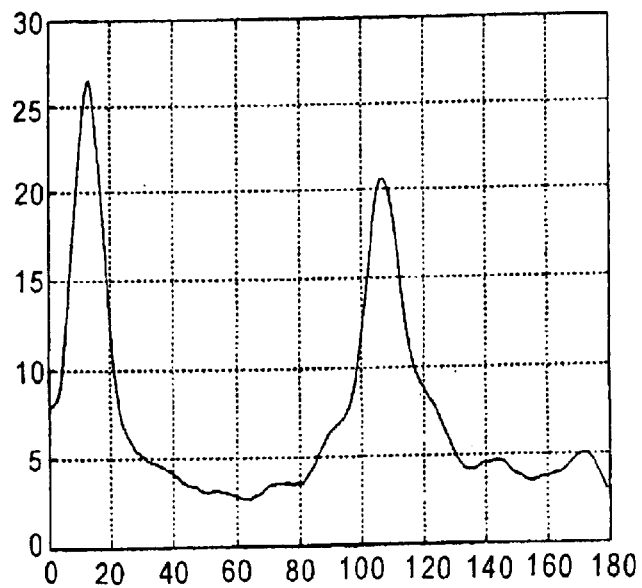

In fact, by thus constructing the direction histograms for the various types of code, it is verified that:

the stacked codes (including the PDF417) and the bar codes are characterized by strong gradient directionality, as can be seen in FIG. 4a, which shows a typical histogram of a stacked code;

the Maxicode is characterized by lack of directionality, as shown in FIG. 4b;

the Datamatrix and the QR-Code are characterized by double directionality in quadrature, as shown in FIG. 4c.

Figure 5:
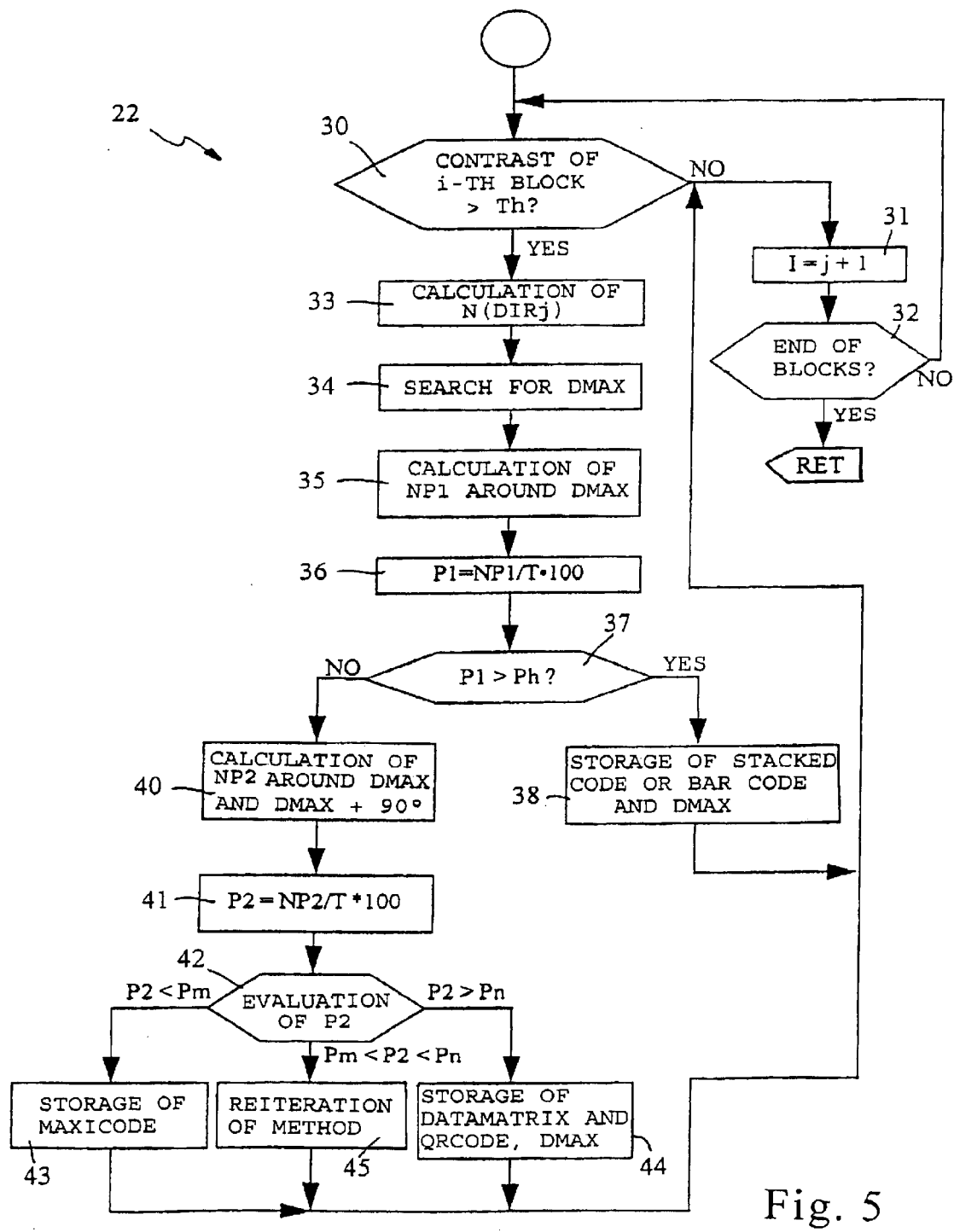
FIG. 5 shows a detailed flow chart of a block of FIG. 3.

On this basis, the step of direction analysis 22 is carried out as illustrated in FIG. 5.

In detail, initially, it is verified whether the contrast of the i-th block (determined in step 21 of FIG. 3) is greater than a predetermined threshold Th, block 30. Otherwise, NO output from block 30, it is verified whether all blocks have been examined, by incrementing a counter i (block 31) and verifying whether the counter i is equal to the total number of blocks (block 32). If this is the case (YES output from block 32), the step of direction analysis 22 ends, otherwise (NO output), a successive block is examined and the program returns to block 30.

If the contrast of the i-th block is greater than the predetermined threshold, YES output from block 30, the prevalent direction is sought, corresponding to the absolute maximum of the direction histogram in the considered block; in particular, firstly, within the gradient direction image and relative to the considered block, the number of dots N(DIRj) having a j-th predetermined direction is determined, considering all the directions between 0° and 180° with a step of 1° for example and counting the number of dots with direction 0°, the number of dots with direction 1°, the number of dots with the direction 2° and so on, block 33. The maximum of the just determined values N(DIRj) is then sought and the direction j associated with this maximum value is stored as the prevalent direction DMAX, block 34.

Subsequently, block 35, the number of dots NP1 having a direction included in a predetermined interval centred on the prevalent direction DMAX is calculated (for example between ±5° and ±15°) and the energy around the maximum value is calculated within the interval selected; the ratio Pi of dots NP1 with respect to the total number T of block dots is calculated as P1=NP1/T*100, block 36 and it is verified whether the just calculated ratio P1 is at least equal to a specific threshold Ph, block 37. The threshold Ph can vary for example between 25% and 40%. If the outcome is positive (YES output), it is stored that the i-th block contains a bar code or a stacked-type code and the prevalent direction DMAX is stored, block 38. Otherwise (NO output from block 37), the sum NP2 is calculated of the dot number in a direction included in a predetermined interval (variable between ±10° and ±20°) of the prevalent direction DMAX and the dot number in a direction included in a predetermined interval (variable for example between ±10° and ±20°) of the quadrature direction with respect to the prevalent direction (DMAX+90°, calculation of the energy associated with the two prevalent directions, block 40); the ratio P2 of the dots NP2 with respect to the total number T of block dots as P2=NP2/T*100 is calculated, block 41, and the value of ratio P2 is checked, block 42. If ratio P2 just calculated is smaller than a first threshold Pm (variable for example between 25% and 35%), it is stored that the i-th block contains a Maxicode code and has a prevalent direction, block 43; if ratio P2 just calculated is at least equal to a second threshold Pn, greater than the first threshold Pm (variable for example between 30% and 40%), it is stored that the i-th block contains a Datamatrix code or a QR-Code and the prevalent directions DMAX and DMAX+90° are stored, block 44; in an intermediate case Pm<P2<Pn, it is stored that the code can be a Maxicode, Datamatrix or QR-Code, block 45, and discrimination is carried out later by the subsequent decoding algorithm, or by reiteration of the indicated method on a block adjacent to the examined one.

In all cases, blocks 43, 44 and 45 are followed by block 31, for optional examination of a successive block.

Back to FIG. 2, the fine locating step 13 can be carried out in a known manner and is therefore not illustrated in detail. It is only remembered that this step requires different methods, according to the code type. For example, for Datamatrix (FIG. 1a), it is possible to determinate the coordinates of the L shape (which delimits the left and lower sides of the code of FIG. 1a), using a corner detection algorithm, described for example in the aforementioned text by D. Montgomery and G. C. Runger, or the standard method proposed by AIM specifications (AIM Specifications for Datamatrix), based on searching for two segments with a minimum dimension (dimension known from the application specifications), which are the two sides in the L-shape.

The search for segments can also be carried out on the digitised image converted to binary form, with a grey threshold (the segment is a sequence of adjacent black pixels), or on the gradient intensity image, carried out pixel by pixel (search for the edges of the L-shape).

As far as the Maxicode is concerned (FIG. 1b), the fine locating step 13 comprises determining the coordinates of the code centre, or Bull Eye (target formed by a series of circles concentric to the code centre), using the standard method described in the AIM specification (AIM specifications for Maxicode), based on searching for the "template" constituted by the alternation of white and black pixels, characteristic of the target.

In the case of linear codes (bar codes) or stacked codes (PDF417), at least three code bars are determined using algorithms for recognizing known segments (see for example the aforementioned text by D. Montgomery and G. C. Runger).

During the fine locating step 13, it is also possible to extract information concerning geometric structure and dimensions of the code, which can be used subsequently in the segmentation step 14. For example in case of Maxicode, the dimensions of the hexagons forming the code are estimated.

The segmentation step 14 separates the code area from the remaining part of the digitised image. The purpose of this operation is to determine the coordinates of the four vertices of the quadrilateral inscribing the code. Segmentation can be carried out by a progressive pixel adding method (region growing) known from the literature (for example using "convex hull" algorithms described in "Algorithms" by R. Sedgewick, Ed. Addison Wesley), using the fine locating information. For example, for a Maxicode, it is possible to apply region-growing, starting from the outer circle of the Bull Eye and having an estimate of the dimensions of the individual hexagons and of the total area occupied by the code. Region-growing uses the presence of quiet areas around the code.

Figure 6A:
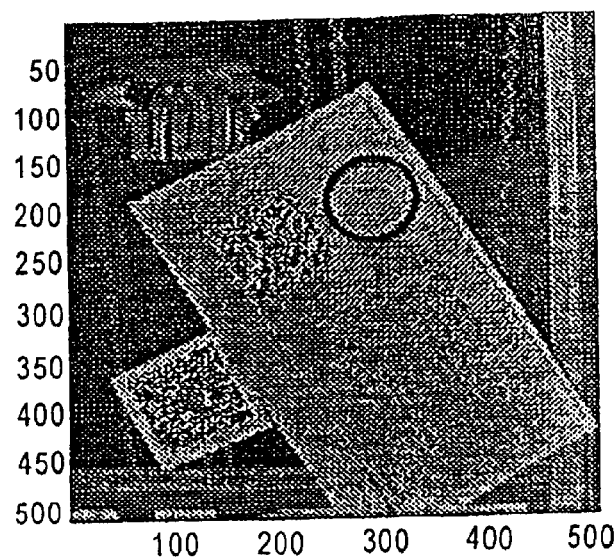
FIG. 6a shows an example of an image containing bidimensional codes to be located.
Figure 6B:
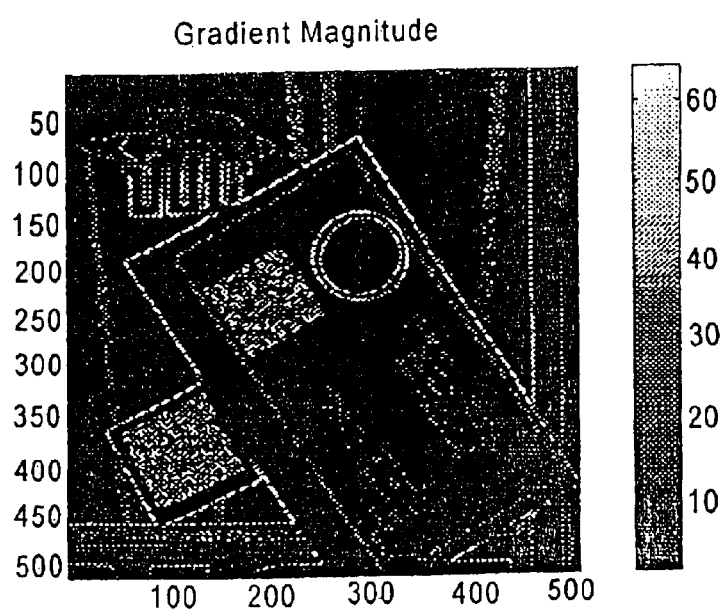
FIGS. 6b, 6c, 6d, 6e and 6f show successive processing operations of the image of FIG. 6a, using the present locating method.
Figure 6C:
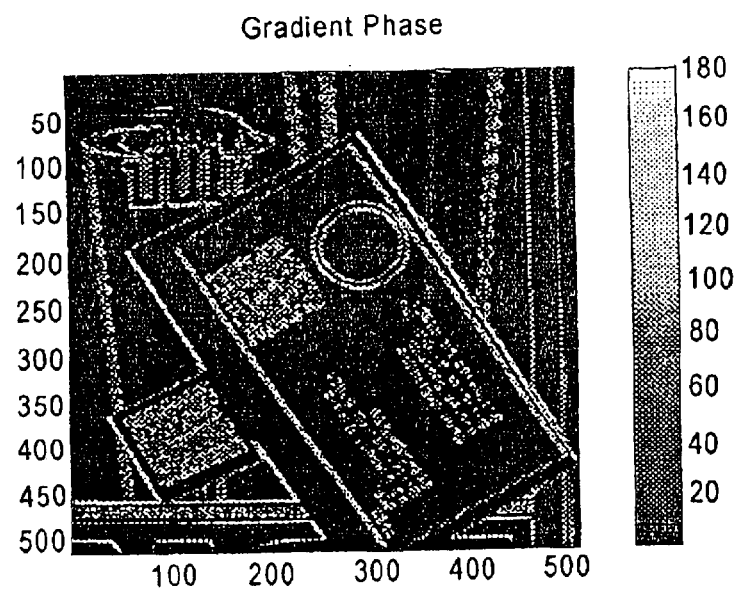

An example is now described regarding application of the steps of extracting the interest features 11 and determining the interest regions 12 for a digitised image, shown in. FIG. 6a. The digitised image, comprising 512×512 pixels, contains two Maxicode codes to be located. FIGS. 6b and 6c show respectively the gradient intensity image and the gradient direction image, as previously described for the step of extracting the interest features 11. FIGS. 6a and 6b also show the respective scales used in the two images.

Figure 6D:
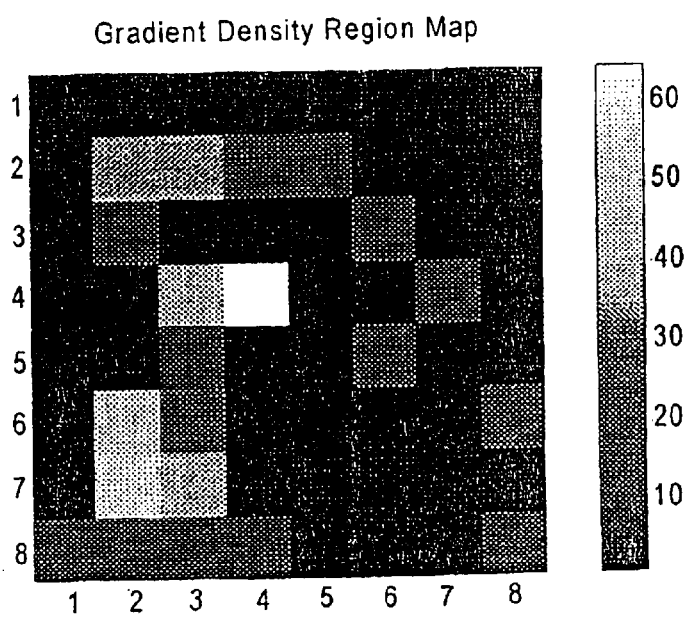

FIG. 6d shows the block contrast image, obtained after dividing into blocks the gradient intensity image of FIG. 6b and calculating the contrast. In practice, in FIG. 6d, each small square represents a block and the image as a whole comprises 8×8 blocks. In FIG. 6d, a level of grey is associated to each block and indicates the contrast level of the block. The lighter the block, the more it is contrasted, as shown on the scale at the right. The figure already clearly shows two blocks which are lighter than the others.

Figure 6E:
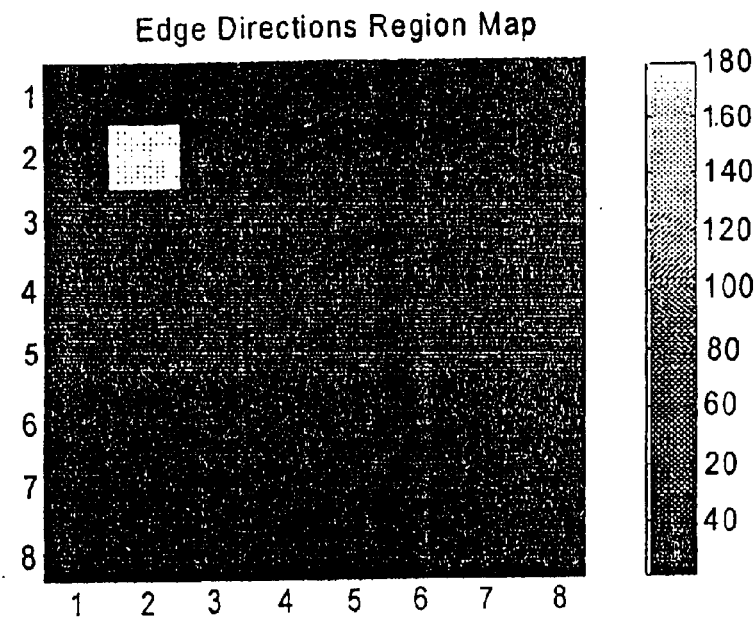

FIG. 6e shows the image obtained after the step of block direction analysis (block 22 of FIG. 5) and it relates specifically only to the blocks which have a single prevalent direction (blocks complying with the condition P1>Ph, block 37 of FIG. 5) and which may therefore contain stacked or bar codes. In the illustrated example, there is a single block, among those sufficiently contrasted shown in FIG. 6d (located in position 2, 2), which has strong directionality.

Figure 6F:
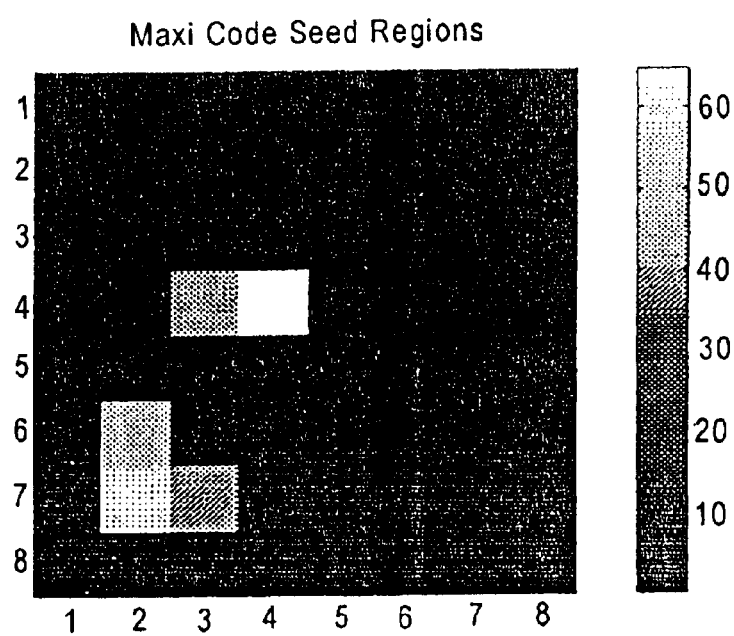

FIG. 6f shows an image derived from FIG. 6d, including only the blocks which have not prevalent directions (blocks complying with the condition P2<Pm, block 43 of FIG. 5 and may therefore contain Maxicode codes) and have a contrast level higher than a specific threshold. The image of FIG. 6f is then subjected to further processing, for grouping the cells starting with the lightest ones (with the greatest contrast), determining the coordinates of the centre of the Bull Eye, finely locating the code, accurately determining the code geometric boundaries; and decoding, as described with reference to blocks 24 and 13–15.

The advantages of the described method are as follows. Firstly, it has a high robustness with respect to geometric deformations and allows locating and segmenting codes acquired with substantial angles of skew and/or pitch. The described method functions reliably also in the case of irregular brightness; in fact, it functions locally and is therefore insensitive to brightness variations in the digitised image as a whole. Finally, the present method speeds up the entire step of decoding bidimensional codes; indeed, the indication of the code type in the interest regions permits direct searching for the specific code which is present, without attempting to search for others. In addition, if the digitised image contains a plurality of codes, code fine locating and segmenting can be carried out in parallel for each of them.

Finally it is apparent that numerous modifications and variants can be made to the method described and illustrated here, all of which come within the scope of the invention, as defined in the attached claims. In particular, the fact is emphasised that instead of being intended for locating and recognizing all possible types of bidimensional codes (including bar codes), the invention can be intended for locating and recognizing a specific code, by limiting the block diagram of FIG. 5 to the required code type.

The procedure for block division (step 20 of FIG. 3) can be modified: if there is a wide variety of dimensions of codes to be decoded, with respect to the dimensions of the digitised image, it is possible to search the interest areas using several block division levels using different scales, which can be used simultaneously or in sequence (firstly the smaller blocks, then the larger ones).

The dimensions of the blocks can be different from those indicated; in particular, the choice is preferably made considering the device optical parameters and the maximum reading distance, such that the maximum block dimension does not exceed the dimension of one code, or such that the maximum block dimension contains a code portion or at the most an entire code, but not more than one code, thus providing a high locating speed.

In addition, although in the given example calculation of the gradient direction image is carried out before division into blocks and for all pixels of the digitised image, it is also possible to carry out this calculation. after division, only for the blocks having at least one minimum gradient intensity value.

Finally, instead of calculating the prevalent brightness gradient direction only for the blocks having a contrast level higher than a specific threshold, it is possible to calculate this prevalent direction for all blocks of the digitised image, if this information can be useful in the subsequent processing, although it will be appreciated that the solution described makes it possible to reduce the number of calculation operations necessary.

What is claimed is:

1. A method for locating a code irrespectively of its type in a bidimensional image, comprising:

acquiring (10) a bidimensional image formed from a plurality of dots characterized, respectively, by a brightness value;

calculating a brightness variation intensity of dots of the bidimensional image with respect to adjacent dots;

dividing (20) said bidimensional image into a plurality of image regions, each of said image regions comprising a respective first number of dots (T);

for each of said image regions, calculating (21) one first quantity correlated to the calculated brightness variation intensities of dots of the image region;

for at least some of said image regions:

calculating a brightness variation direction of dots of the bidimensional image with respect to adjacent dots, calculating (22) at least one second quantity (P1, P2) correlated to the calculated brightness variation directions of dots of the image region;

wherein said brightness variation intensities, said brightness variation directions, said first quantities and said at least one second quantities are calculated irrespectively of the code type, and determining (35–44) any presence and type of a code in each of said image regions by analysing said first and said second quantities.

2. A method according to claim 1, wherein said step of calculating (21) one first quantity comprises the step of calculating a contrast value for each of said image regions.

3. A method according to claim 2, wherein said step of calculating a contrast value comprises the step of calculating a brightness gradient for each dot of a respective image region, with respect to adjacent dots, and adding said brightness gradient calculated for all the dots of said respective image region.

4. A method according to claim 1, characterized in that said step of calculating (22) at least one second quantity (P1, P2) comprises the step of searching for a prevalent direction (DMAX) from said calculated brightness variation directions.

5. A method according to claim 4, characterized in that said step of searching comprises the steps of:

calculating (33) the number of dots of said respective image region having a predetermined brightness variation direction, thus obtaining a plurality of numerical values, each associated with one of said predetermined brightness variation direction; and from said values of said predetermined brightness gradient direction, acquiring (34) a direction value associated with the maximum of said numerical values.

6. A method for locating codes in bidimensional images comprising:

acquiring (10) a bidimensional image formed from a plurality of dots characterized, respectively, by a brightness value;

dividing (20) said bidimensional image into a plurality of image regions, wherein each of said image regions comprises a respective first number of dots (T);

for each of said image regions, determining (21) a first quantity correlated to the brightness variation intensity of respective dots with respect to adjacent dots by calculating a contrast value for each of said image regions;

wherein said contrast values are calculated by calculating the ratio between a second number of dots of said respective image region, having brightness greater than a predetermined threshold, and a third number of dots of said respective image region, having brightness lesser than said predetermined threshold, for each of said image regions, determining (22) at least one second quantity (P1, P2) correlated to the brightness variation direction of the respective dots with respect to adjacent dots; and determining (35–44) any presence and type of a code in each of said image regions, on the basis of said first and said second quantity.

7. A method for locating codes in bidimensional images comprising:

acquiring (10) a bidimensional image formed from a plurality of dots characterized, respectively, by a brightness value, wherein said method comprises:

dividing (20) said bidimensional image into a plurality of image regions, each of said image regions comprising a respective first number of dots (T);

for each of said image regions, determining (21) a first quantity correlated to the brightness variation intensity of respective dots with respect to adjacent dots;

for each of said image regions, determining (22) at least one second quantity (P1, P2), correlated to the brightness variation direction of the respective dots with respect to adjacent dots, wherein said second quantity is determined by:

calculating (33) a brightness gradient direction for each dot of a respective image region, with respect to adjacent dots, and searching for a prevalent direction (DMAX) from said calculated brightness gradient directions, each associated with a respective dot in said image region;

wherein the step of searching comprises the steps of:

calculating (33) the number of dots of said respective image region having a predetermined brightness gradient direction, thus obtaining a plurality of numerical values, each associated with one of said predetermined values of said brightness gradient direction: and from said values of said predetermined brightness gradient direction, acquiring (34) a direction value associated with the maximum of said numerical values; and determining (35–44) any presence and type of a code in each of said image regions, on the basis of said first and said second quantity by:

calculating (35, 36) for each said image region, a direction value (P1) correlated to the rate of dots of said image region having a brightness gradient direction value close to said prevalent direction (DMAX);

verifying (37) whether said direction value (P1) exceeds a first predetermined threshold;

if so, associating (38) said respective image region with a first type of code.

8. A method according to claim 7, wherein said first type of code comprises at least one member selected from the group consisting of bar codes and stacked codes.

9. A method according to claim 7, wherein said step of calculating a direction value (35, 36) comprises the steps of calculating (35) a fourth number of dots (NP1) having a brightness gradient direction value within a first direction interval including said prevalent direction (DMAX) and calculating (36) the ratio between said fourth number of dots and said first number of dots (T).

10. A method according to claim 9, wherein said first interval comprises ±15° with respect to said prevalent direction.

11. A method according to claim 9, wherein said first interval comprises ±5° with respect to said prevalent direction.

12. A method according to claim 7, wherein, after said step of determining a first quantity (21), the step of selecting (30) high contrast regions from said image regions, wherein said first quantity is greater than a predetermined value, is carried out, and wherein said step of determining (35–44) any presence and type of a code is carried out only for said high contrast regions.

13. A method for locating codes in bidimensional images comprising:

acquiring (10) a bidimensional image formed from a plurality of dots characterized, respectively, by a brightness value, wherein said method comprises:

dividing (20) said bidimensional image into a plurality of image regions, each of said image regions comprising a respective first number of dots (T);

for each of said image regions, determining (21) a first quantity correlated to the brightness variation intensity of respective dots with respect to adjacent dots;

for each of said image regions, determining (22) at least one second quantity (P1, P2), correlated to the brightness variation direction of the respective dots with respect to adjacent dots, wherein said second quantity is determined by:

calculating (33) the brightness gradient direction for each dot of a respective image region, with respect to adjacent dots, and searching for a prevalent direction (DMAX) from said calculated brightness gradient directions by:

calculating (33) the number of dots of said respective image region having a predetermined brightness gradient direction, thus obtaining a plurality of numerical values, each associated with one of said predetermined values of said brightness gradient direction; and from said values of said predetermined brightness gradient direction, acquiring (34) a direction value associated with the maximum of said numerical values;

determining (35–44) any presence and type of a code in each of said image regions, on the basis of said first and said second quantity:

wherein said step of determining (35–44) any presence and type of a code comprises the steps of:

calculating (40, 41) for each said image region a bidirectionality value (P2) correlated to the rate of dots of said image region which have a brightness gradient direction value close to said prevalent direction (DMAX) and of dots of said image region which have a brightness gradient value close to a quadrature direction (DMAX+90°) that is perpendicular to said prevalent direction; and verifying (42) whether said bidirectionality value exceeds a second predetermined threshold;

if the bidirectionality value exceeds said second predetermined threshold, associating (44) said respective image region with a possible second code type.

14. A method according to claim 13, wherein said second code type is selected from the group consisting of Datamatrix and QR-Codes.

15. A method according to claim 14, wherein said step of calculating (40, 41) a bidirectionality value comprises the steps of calculating (40) a fifth number of dots (NP2) which have a brightness gradient direction value that are in a second and a third direction interval, including, respectively, said prevalent direction and said quadrature direction; and calculating (41) the ratio between said fifth number of dots and said first number of dots (T).

16. A method according to claim 15, wherein said second interval is ±20° with respect to said prevalent direction (DMAX), and said third interval is ±10° with respect to said quadrature direction (DMAX±90°).

17. A method according to claim 15, wherein said second interval is ±10° with respect to said prevalent direction (DMAX), and said third interval is ±10° with respect to said quadrature direction (DMAX±90°).

18. A method according to claim 13, further comprising the steps of:

verifying (42) whether said bidimensionality value is lower than a third predetermined threshold that is lower than said second predetermined threshold;

if so, associating (43) said respective image region with a possible third code type.

19. A method according to claim 18, wherein said third code type comprises Maxicode codes.

20. A method for locating codes in bidimensional images, comprising the step of acquiring (10) a bidimensional image formed from a plurality of dots characterized, respectively, by a brightness value, and the steps of:

dividing (20) said bidimensional image into a plurality of image regions, each of said image regions comprising a respective first number of dots (T);

for each of said image regions, determining (21) a first quantity correlated to the brightness variation intensity of respective dots with respect to adjacent dots;

for each of said image regions, determining (22) at least one second quantity (P1, P2) correlated to the brightness variation direction of the respective dots with respect to adjacent dots; and determining (35–44) any presence and type of a code in each of said image regions, on the basis of said first and said second quantity, wherein said method further comprises, after said step of determining any presence of codes:

ordering (23), on the basis of the importance, the image regions having a predetermined code type; and associating (24) said ordered image regions by a region-growing step.

21. A method according to claim 20, wherein said step of ordering (23) comprises the step of ordering said image regions according to said first quantity.

* * * * *

UNITED STATES PATENT AND TRADEMARK OFFICE
CERTIFICATE OF CORRECTION

PATENT NO. : 6,775,409 B1
DATED : August 10, 2004
INVENTOR(S) : Elena Brunelli et al.

It is certified that error appears in the above-identified patent and that said Letters Patent is hereby corrected as shown below:

<u>Title page,</u>
Item [73], Assignee, "Data Logic S.p.A., Di Reno (IT)" should be listed as -- Datalogic S.p.A., Lippo di Calderara di Reno - BO (IT) --.

Signed and Sealed this

Twelfth Day of April, 2005

JON W. DUDAS
*Director of the United States Patent and Trademark Office*